(12) United States Patent
Savage et al.

(10) Patent No.: US 7,464,342 B2
(45) Date of Patent: Dec. 9, 2008

(54) CUSTOMIZABLE SERVICE PROVIDER USER INTERFACE

(75) Inventors: Tammy L Savage, Seattle, WA (US); Melora Zaner-Godsey, Seattle, WA (US); Wende E Copfer, Bothell, WA (US); Allison O'Mahony, Redmond, WA (US); Rodney C Edwards, Redmond, WA (US); Darwin K Yamamoto, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/276,446

(22) Filed: Feb. 28, 2006

(65) Prior Publication Data

US 2007/0204233 A1 Aug. 30, 2007

(51) Int. Cl.
*G06F 15/00* (2006.01)
*G06F 13/00* (2006.01)
(52) U.S. Cl. ...................... 715/840; 715/853
(58) Field of Classification Search ......... 715/763–765, 715/853–854, 837–840; 345/349, 340
See application file for complete search history.

(56) References Cited

U.S. PATENT DOCUMENTS

| 7,342,587 B2 * | 3/2008 | Danzig et al. ............... 345/473 |
| 2002/0087289 A1 | 7/2002 | Halabieh |
| 2002/0097277 A1* | 7/2002 | Pitroda ...................... 345/854 |
| 2004/0012626 A1 | 1/2004 | Brookins |
| 2006/0136829 A1 | 6/2006 | Abbar et al. |
| 2007/0106952 A1* | 5/2007 | Matas et al. ................ 715/764 |

OTHER PUBLICATIONS

PCT Intl Search Report and Written Opinion for Application No. PCT/US2007/004822, dated Aug. 13, 2007, 7 pgs.

* cited by examiner

*Primary Examiner*—Kevin Nguyen
(74) *Attorney, Agent, or Firm*—Lee & Hayes, PLLC

(57) ABSTRACT

A customizable service provider user interface is described. In an implementation, a user is logged onto a suite a web services, to which, the user has not previously logged on. A user interface is output having a plurality of portions, one or more of which are customizable by the user through use of one or more overlays to customize interaction with the suite of web services.

15 Claims, 10 Drawing Sheets

CUSTOMIZABLE SERVICE PROVIDER USER INTERFACE

BACKGROUND

A vast amount of content is available to a user via network access, and the amount is ever increasing. For example, users currently have access to billions of web pages via the Internet. Further, the types of content that are available is also increasing, from web pages to images to downloadable music and so on. Therefore, it may be difficult for the users to locate particular content of interest from this amount and types of content A variety of techniques may be utilized to access and interact with content. For example, a user may access a "search engine" to search web pages. The search engine is typically accessed via a web site address and works as a stand-alone program that maintains a database of information collected over the Internet. For example, the search engine may be used like a card catalog to locate a particular web page of interest by performing text searches, such as to locate a web page having keywords that were provided by a user.

Traditional search engines, however, were configured for the sole purpose of providing an Internet search and thus were typically viewed via sparse web pages that were generally devoid of other content. One technique that was used to promote traffic to the search engine is through configuration as a web portal, such that the web portal acted as a "starting point" by the user for accessing content over the Internet. The web portal, for instance, may include search functionality as well as an output of content, such as news articles and sports scores. Although in some instances this output of content was customizable by the user, the customization caused the user to leave the initial "experience" when interacting with the search engine, such as to navigate from an initial web page to one or more other web pages to select content. Additionally, the initial experience may also be sparse, thereby adversely affecting the user's initial judgment of the search engine and making the customization seem daunting to the user.

SUMMARY

A customizable service provider user interface is described. In an implementation, a user is logged onto a suite a web services, to which, the user has not previously logged on. A user interface is output having a plurality of portions, one or more of which are customizable by the user through use of one or more overlays to customize interaction with the suite of web services. In another implementation, the portions animate from an initial size to an expanded size when displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

A vast amount of content is available to a user via the Internet. To access this content, a user may access a "search engine" to search web pages. Traditional search engines, however, were typically configured for the sole purpose of providing an Internet search and thus were viewed via sparse web pages that were generally devoid of other content. For example, the search engine may include a search portion configured to receive text and a logo of the service provider.

In order to promote traffic to the search engine for other purposes, the search engine may be configured as a web portal to act as a "starting point" by the user for accessing content over the Internet. The web portal, for instance, may also include content, such as news articles and sports scores. However, although this output of content may be customizable by the user in some instances, traditional customization techniques caused the user to navigate between different experiences. For example, the user may logon to a service and access a default web page. To customize the web page, the user navigates to other pages displayed separately from the web page to choose content. Thus, the user leaves the initial "experience" and navigates through one or more other experiences to customize the content. Therefore, the user was forced to navigate back to the customized page to determine if the customization was desired and continue navigating back and forth between the page(s) to make changes to perform additional customization. Additionally, the initial experience may also be sparse, thereby adversely affecting the user's initial judgment of the search engine and making the customization seem daunting. Further, this interface was traditionally provided separately from a user interface that related to local content.

Accordingly, a customizable service provider user interface is described. In an implementation, the user interface is customizable through the use of overlays such that the user remains in the experience being customized. For example, the overlay may be provided as a translucent layer over the experience being customized. As customizations are being made, the customizations may be viewed "through" at least a portion of the overlay. Additionally, animations may be provided that improve the user's experience with the user interface. Further, the user interface may incorporate content that is local to a client device, thereby providing a "unified" experience. Further discussion of these and other techniques may be found in relation to FIGS. 3-10.

Exemplary Environment

Figure 1:
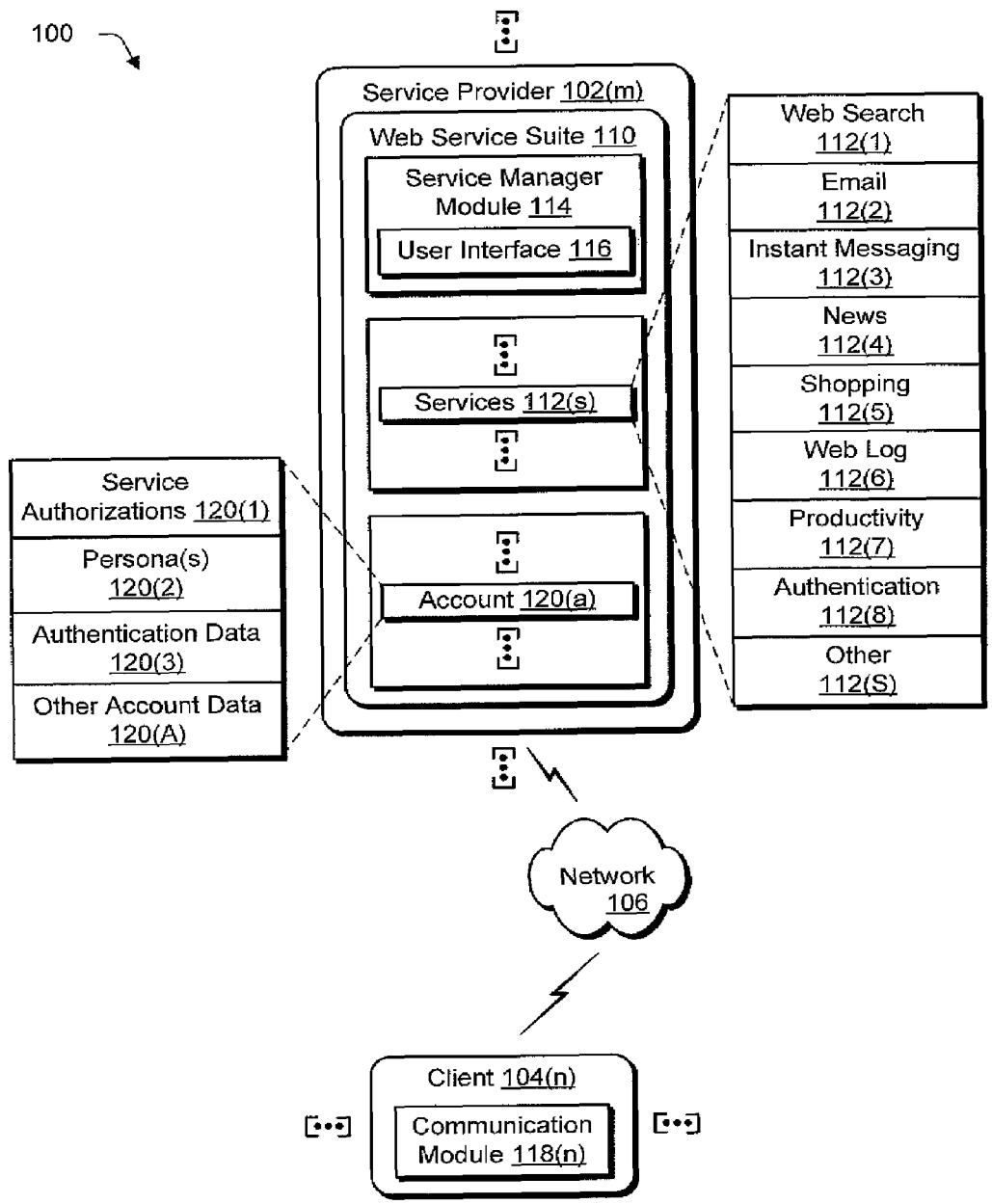
FIG. 1 is an illustration of an environment in an exemplary implementation that is operable to employ preview and refinement techniques.

FIG. 1 is an illustration of an environment 100 in an exemplary implementation that is operable to employ customization techniques. The illustrated environment 100 includes a plurality of service providers 102(m) (where "m" can be any integer from one to "M") and a plurality of clients 104(n) (where "n" can be any integer from one to "N") that are communicatively coupled over a network 106.

The clients 104(n) may be configured in a variety of ways for accessing the service provider 102(m). For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory, processing and/or display resources (e.g., traditional set-top boxes, hand-held game consoles, wireless phones). For purposes of the following discussion, the clients 104(n) may also relate to a person and/or entity that operate the clients. In other words, one or more of the clients 104(n) may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The service provider 102(m) is illustrated as having a web service suite 110 having a plurality of services 112(s) (where "s" can be any integer from one to "S") that are accessible via the network 106. The services 112(s) may be configured in a variety of ways to provide functionality over the network 106 to the clients 104(n). For example, the services 112(s) may be configured for access via platform-independent protocols and standards to exchange data over the network 106. The services 112(s), for instance, may be provided via an Internet-hosted module that is accessed via standardized network protocols, such as a simple object access protocol (SOAP) over hypertext transfer protocol (HTTP), extensible markup language (XML), and so on, further discussion of which may be found in relation to FIG. 2.

A wide functionality may be made available via the plurality of services 112(s). For example, a web search 112(1) service (e.g., a search engine) may be provided to search the Internet, an email 112(2) service may be provided to send and receive email, and an instant messaging 112(3) service may be provided to provide instant messaging between the clients 104(n). Additional examples include a news 112(4) service, a shopping (e.g., "ecommerce") 112(5) service and a web log 112(6) service. Further, productivity 112(7) services may also be provided, such as word processing, spreadsheets, presentations, drawings, note-taking, and so on. For instance, network access may be given to the client 104(n) to applications that were traditionally executed locally on the client 104(n) itself. Therefore, execution of the modules may be performed remotely at the service provider 102(m) and results of the execution may be communicated over the network 106 to the client 104(n). An authentication service 112 (8) may also be provided to authenticate clients 104(n) to access other services, which may include other services provided by the service provider 102(m) as well as other services provided by other service providers. Although a few examples of services have been described, it should be apparent that a wide variety of other services 112(S) are also contemplated.

The service provider 102(m) is also illustrated as having a service manager module 114, which is representative of functionality used by the service provider 102(m) to manage access to the services 112(s) over the network 106, performance of the services 112(s), and so on. Although illustrated separately, the functionality represented by the service manager module 114 may be incorporated within the services 110(s) themselves.

The service manager module 114, for instance, may be utilized to generate a user interface 116 that is provided over the network 106 to the client 104(n) to enable the client 104(n) to interact with the services 112(s). For example, the user interface 116 may be output through use of a communication module 118(n) that is executable on the client 104(n) to render the user interface 116, and more particularly data used to form the user interface. The user interface 116 may be utilized for a variety of purposes and may be customizable via the client 104(n), further discussion of which may be found in relation to FIGS. 3-9.

Additionally, the service manager module 114 may manage a plurality of accounts 120(a) (where "a" can be any integer from one to "A"), each of which represents data that is utilized for interaction by the clients 104(n) with the plurality of service 112(s). For example, account 120(a) may correspond to a particular client 104(n) and include service authorizations 120(1) which indicate whether the client 104(n) is permitted to interact with particular ones of the services 112(s), if any, such as due to expiration or lack of payment information.

The account 120(a) may also include one or more personas(s) 120(2) of the client 104(n), which are used to provide different external representations of the client 104(n). For instance, a "work" persona may be utilized by the client 104(n) for interactions related to work (e.g., work email and instant messaging) and a "personal" persona may be used to interact with family and friends. Each persona may provide a different external representation for how other clients "see" the client, such as a different email address, user tile, and so on. The account 120(a) may also include authentication data 120(3) (e.g., name and password) that is used to authenticate the client's 104(n) identity. A wide variety of other client data 120(A) is also contemplated, such as personalized emoticons, audio files, and so on.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the user interface techniques described below are platform-independent, meaning that the techniques may be implemented on a variety of commercial computing platforms having a variety of processors.

Figure 2:
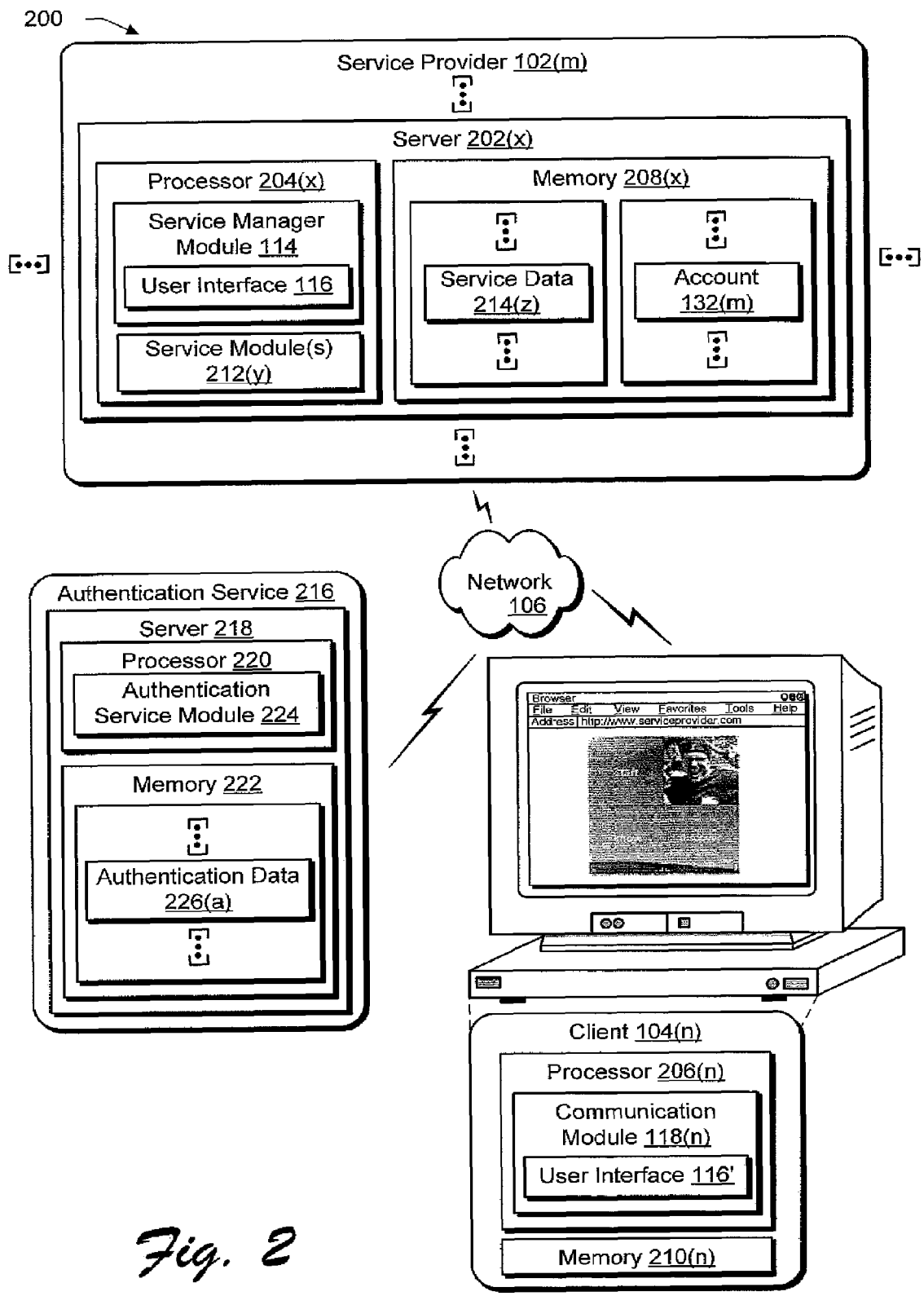
FIG. 2 is an illustration of a system in an exemplary implementation showing a service provider and client of FIG. 1 in greater detail.

FIG. 2 is an illustration of a system 200 in an exemplary implementation showing the service provider 102(m) and the client 104(n) in greater detail. In FIG. 2, the service provider 102(m) is illustrated as being implemented by a plurality of servers 202(x) (where "x" can be any integer from one to "X") and the client 104(n) is illustrated as a client device.

The server 202(x) and the client 104(n) each include a respective processor 204(x), 206(n) and respective memory 208(x), 210(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(x), 210(n) is shown, respectively, for the server 202(x) and the client 104(n), a wide variety of types and combinations of memory may be employed, such as random access memory (RAM), hard disk memory, removable medium memory, and so forth.

As previously described, the services 112(s) of FIG. 1 may be configured in a variety of ways to provide functionality over the network 106 to the client 104(n). For example, the services 112(s) may be provided via one or more service module(s) 212(y), which are illustrated as being executed on the processor 204(x) and are storable in memory 208(x). The service modules(s) 212(y) in this instance are configured as an Internet-hosted module that is accessed via standardized network protocols. The service module(s) 212(y), when executed, may also use respective service data 214(z) to provide corresponding functionality. For example, service module 212(y) may be configured as an Internet search module (e.g., a search engine) that examines service data 214(z) configured as an indexed search database to provide Internet searches. A variety of other examples are also contemplated.

Additionally, a service may also be provided as a standalone service. For example, an authentication service 216 may be provided by a server 218 configured for network 106 access and that has a processor 220 and memory 222. The authentication service 216 includes an authentication service module 224 that is executable on the processor 220 to authenticate the client 104(n) using authentication data 226(a), where "a" can be any integer from one to "A". For instance, the client 104(n) may provide a name and password which is authenticated by the authentication service module 224 using the authentication data 226(a). When the authentication is successful (i.e., the client 104(n) "is who they say they are"), the authentication service module 224 may pass a token to the client 104(n) that is used by the client to access services 110(s) of the service provider 102(m). The token may also be used to access other services by other service providers such that the client 104(n) is not forced to re-authenticate to access each of the plurality of service providers 102(m). A variety of other examples are also contemplated.

The service manager module 114 is also illustrated as being executed on the processor 204(x) and is storable in memory 208(x) of the server 202(x). As previously described, the service manager module 114 is representative of functionality that manages interaction of the client 104(n) with the plurality of services 112(s) of FIG. 1, which are implemented by the service module(s) 212(y) and service data 214(z) of FIG. 2. For instance, the service manager module 114 may provide data sufficient to form a user interface 116. This data may be communicated over the network 106 to the client 104(n) and used by the communication module 118(n) (which is illustrated as being executed on the processor 206(n) and is storable in memory 210(n)) to output user interface 116'. The user interface 116' may be configured in a variety of ways to provide this interaction, further discussion of which may be found in relation to the following figures.

Exemplary Procedures

The following discussion describes user interface techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

In portions of the following discussion, reference will be made to the environment 100 of FIG. 1 and the system 200 of FIG. 2.

Figure 3:
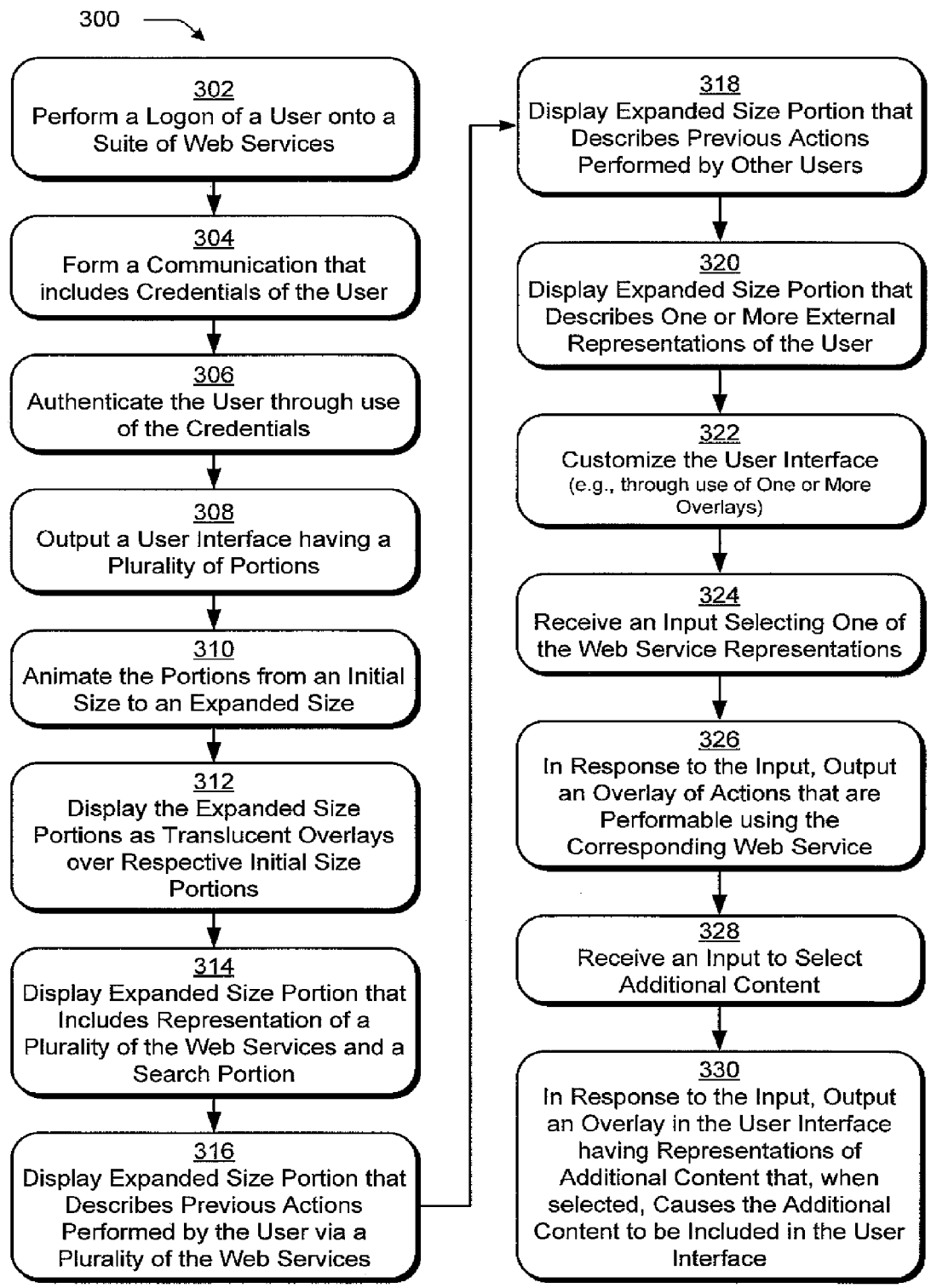
FIG. 3 is a flow diagram depicting a procedure in an exemplary implementation in which a service provider user interface is customized.
Figure 4:
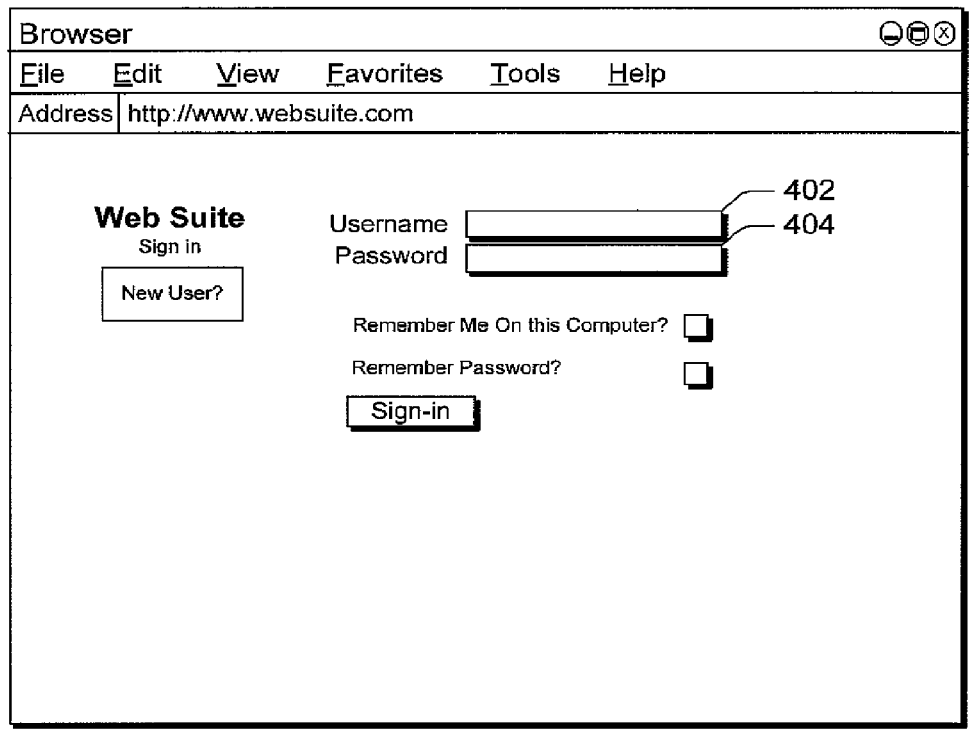
FIGS. 4-10 are illustrations of exemplary user interfaces that are customized through implementation of the procedure of FIG. 3.

FIG. 3 is a flow diagram depicting a procedure 300 in an exemplary implementation in which a service provider user interface is customized. During the discussion of the procedure 300 of FIG. 3, reference will also be made to the exemplary user interfaces 400-1000 of FIGS. 4-10.

A logon is performed of a user onto a suite of web services (block 302). For example, the user interface 400 of FIG. 4 includes portions 402, 404 that accept as inputs a username and password, respectively. Once input, a communication may be formed that includes credentials (e.g., the username and password) of the user (block 304) for authentication. The credentials, for instance, may be communicated to the authentication service 216 for authentication (block 306) by using corresponding authentication data 226(a).

Once authenticated, a user interface is output having a plurality of portions (block 308). For example, the user interface 500 of FIG. 5 includes portions 502, 504, 506 and 508, each of which corresponds to a particular scenario, and together, provides an integrated user experience to interact with the plurality of services. The portions may then be animated from the initial size of FIG. 5 to an expanded size (block 310) as shown in the user interface 600 of FIG. 6.

Figure 5:
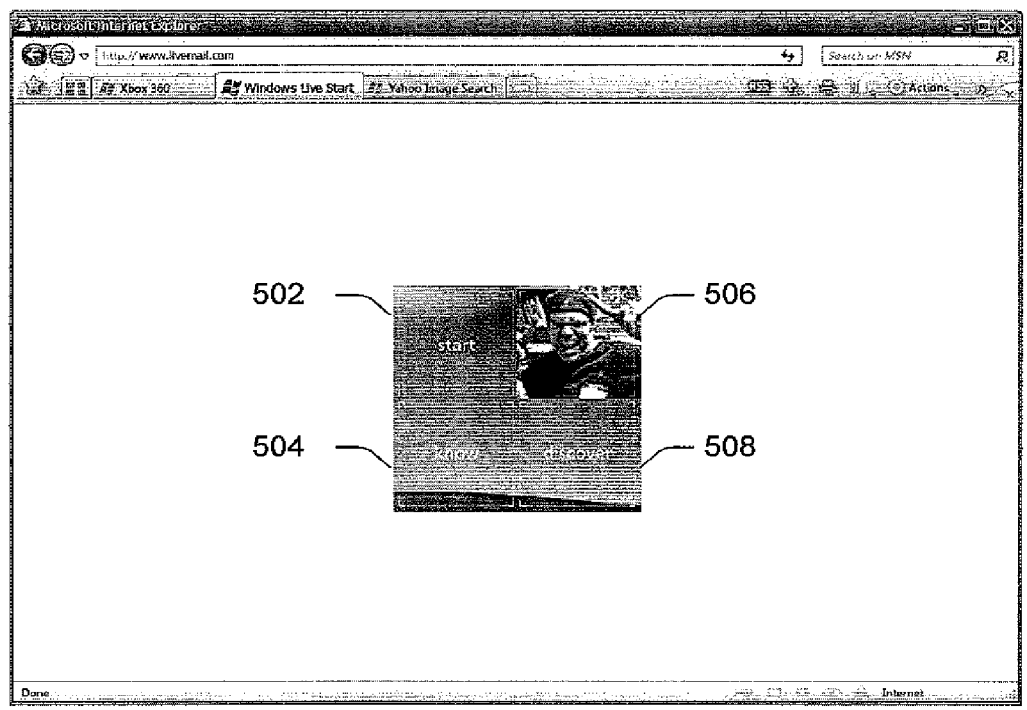
Figure 6:
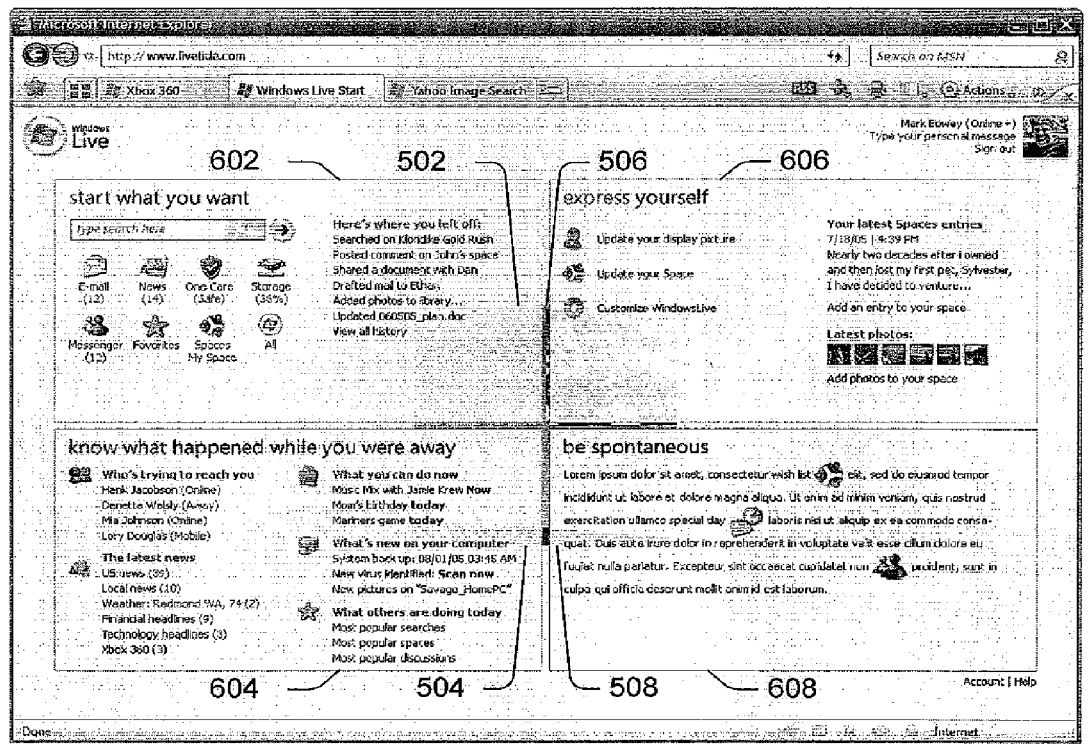
Figure 7:
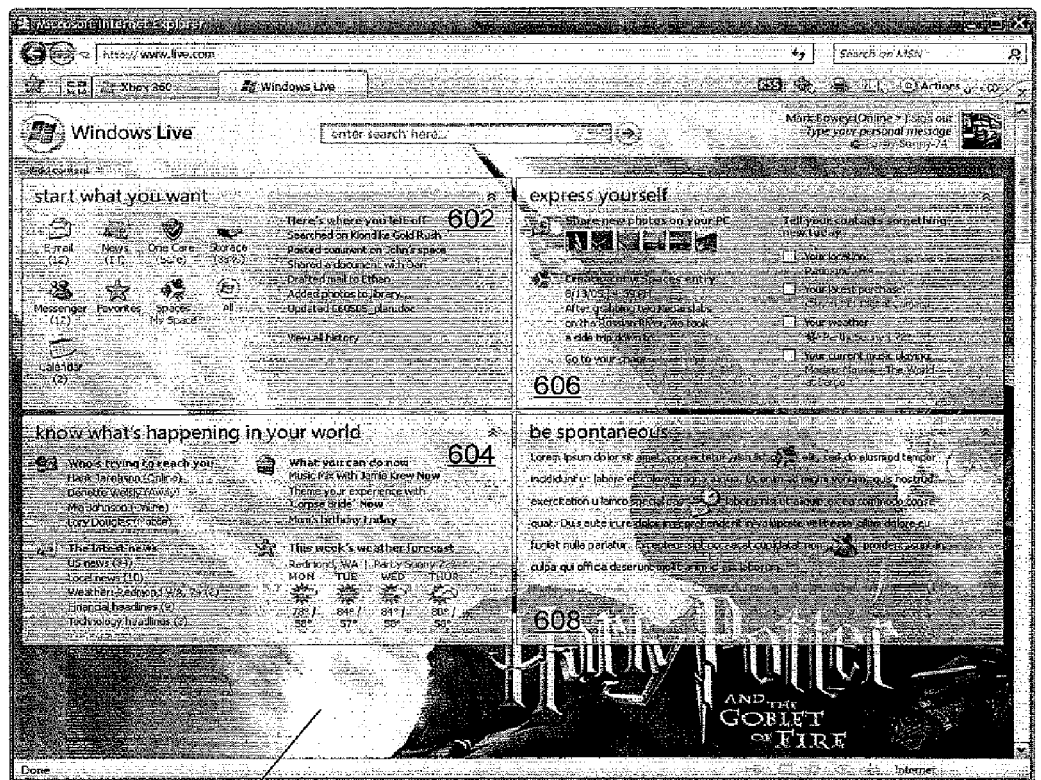

FIG. 6 shows a user interface having expanded portions 602, 604, 606 and 608 that correspond, respectively, to the initial portions 502, 504, 506 and 508 of FIG. 5. The expanded portions 602-608 are displayed as a translucent overlay that is layered over the initial portions 502-508 (block 312) such that the initial portions 502-508 remain partly visible "through" the expanded portions 602-608. Each of the expanded portions 602-608, and their corresponding initial portions 502-508, relate to different usage scenarios relating to the web service suite 110.

The scenarios, for instance, may relate to relationships, information, inspiration and protection. These scenarios are represented by the portions in the user interface 600 of FIG. 6 such that users can "start" interaction with a service; "express" themselves and build their identity; "know" what is happening in their world by quickly seeing who is trying to reach them, what is the latest news and how they are being protected; as well as "discover/explore" new ways of interacting and sharing their content using the web service suite 110.

For example, an expanded size portion 602 may be displayed that includes representations of a plurality of the web services and a search portion (block 314). Thus, this expanded size portion 602 enables the user to navigate to services of interest and search for particular items of interest, such as email, instant messages, images, web sites, documents, and so on.

The expanded size portion 602 may also display descriptions of previous actions performed by the user via a plurality of the web services (block 316). For example, the expanded size portion 602 may describe actions performed by the user in conjunction with an Internet search service (e.g., "Searched on Klondike Gold Rush"), interacted with a web log service (e.g., "Posted comment on John's space"), interacted with a productivity service (e.g., "Shared a Document with Dan"), interacted with an email service (e.g., "Draft mail to Ethan"), interacted with an image service (e.g., "Added photos to library"), interacted with a document sharing service (e.g., "Updated 060505_plan.doc"), and so on. Thus, the user may be provided with a history of their interaction with a plurality of web services of the web service suite 110.

Likewise, an expanded size portion may be displayed that describes previous action performed by other users (block 318), such as communication attempts made by the other users to contact the authenticated user. For instance, expanded portion 604 includes a section titled "Who's trying to reach you" which may describe communication attempts made by other users via instant messaging, email, voice over Internet Protocol (VoIP), and so on. This expanded size portion 604 also includes content that describes "what else is going on in the world" since last login, such as news, changes made to the client device 104(n) (e.g., "What's new on your computer"), and so on.

An expanded size portion 606 may also be utilized to describe one or more external representations of the user (block 320). In this instance, expanded size portion 606 describes how the user is "seen" by other users, such as through the use of one or more person as previously described.

Through use of these portions 502-508, 602-608, the user may customize the user interface (block 322) for a personalized experience. For example, as shown in the user interface 700 of FIG. 7 the user may specify a particular background image 702 of which the expanded size portions 602-608 may be displayed as a translucent overlay. Thus, the expanded size portions 602-608 may enable additional data (e.g., in this instance the "Harry Potter" background) to also be displayed, thereby effectively expanding the available display area. A variety of other customizations are also contemplated.

Figure 8:
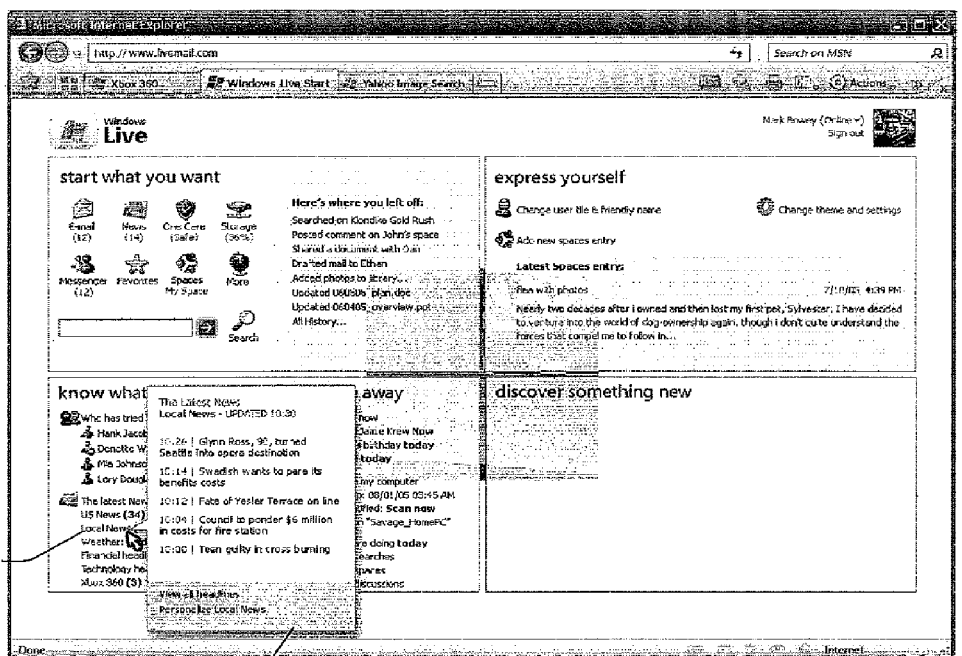

For example, an input may be received that selects one of the web service representations (block 324). In response to the input, an overlay is output of actions that are performable using the corresponding web service (block 326). For example, the user interface 800 of FIG. 8 is illustrated as having an overlay 802 that includes a display of actions and content relating to a local news web service. It should also be apparent that the overlay 802 may be configured in a variety of other ways, such as to provide a "preview", other "contextual actions", and so on. Output of the overlay 802 may be caused in a variety of ways, such as by "right clicking" a corresponding representation 804, "hovering" (i.e., positioning the cursor proximally to but not "clicking") a cursor over the representation 804 for a predetermined amount of time, and so on. The overlay 802 is then displayed proximally to the representation 804 such that correspondence between the overlay 802 and the representation 804 is readily determined. As previously described, through use of the overlay 802, the user is not forced to navigate away from the current experience to perform additional actions relating to particular service and/or to obtain additional information.

Figure 9:
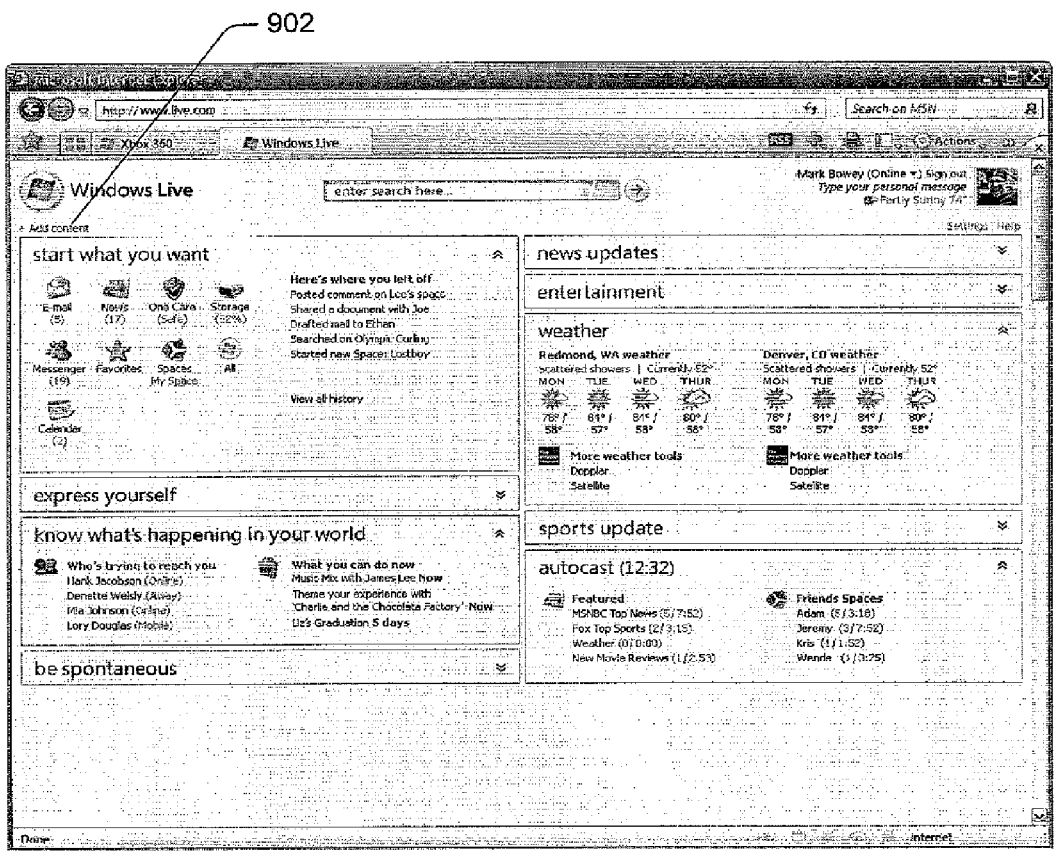
Figure 10:
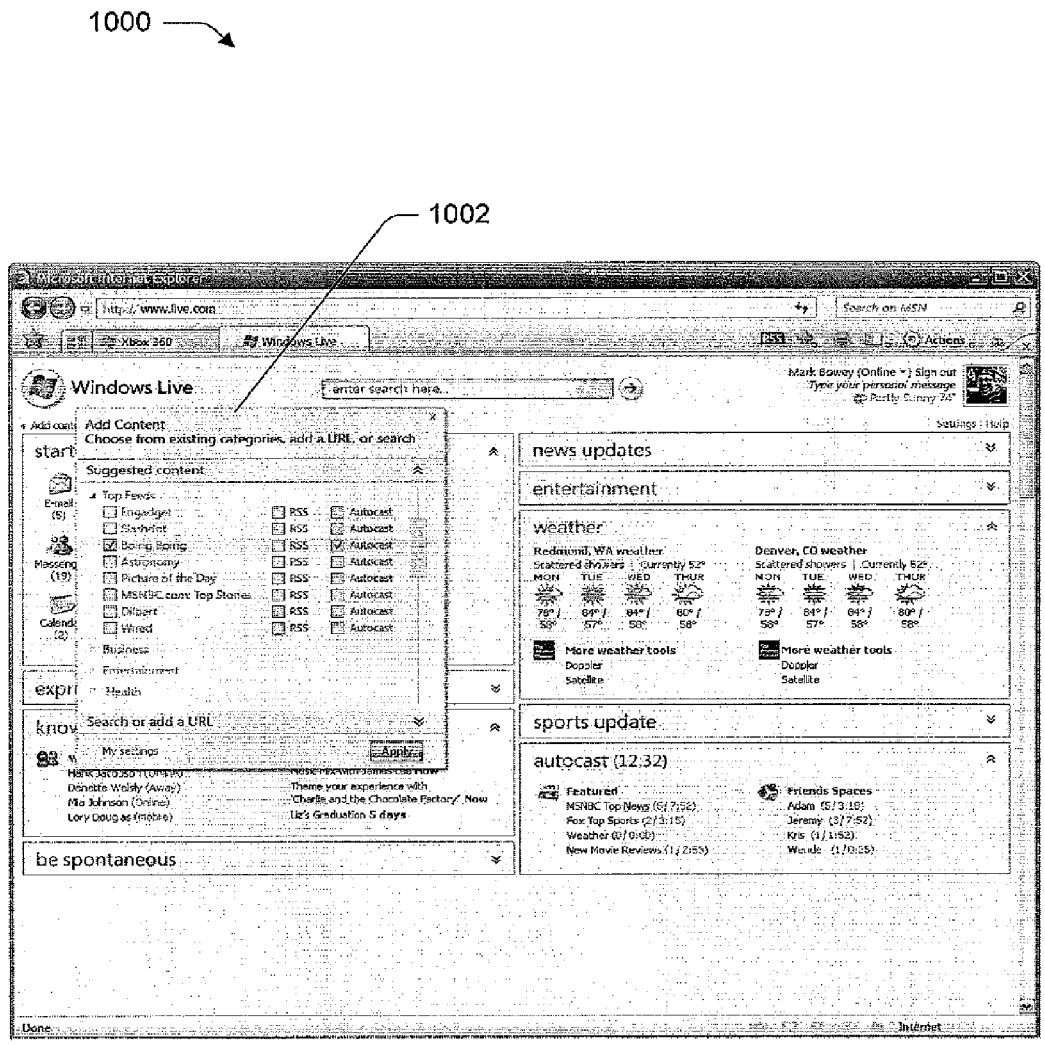

In another example, an input is received to select additional content (block 328). In response to the input, an overlay is output in the user interface having representations of additional content that, when selected, causes the additional content to be included in the user interface (block 330). For example, the user interface 900 of FIG. 9 shows a feature of "add content" 902 that is selectable, such as through use of a cursor control device. When selected, the "add content" 902 feature causes an overlay 1002 to be output, as shown in the user interface 1000 of FIG. 10. The overlay 1002 includes a plurality of representations of content that are selectable to cause the represented content to be included in the user interface 1000. In an implementation, when selection of content is achieved (e.g., through use of the check box and the "apply" button), this selected content is added to the user interface 1000 such that the user is provided with real time view of content changes. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising: performing a logon of a user onto a suite of web services; and outputting a user interface in response to an acceptance of the logon, the user interface including: a plurality of scenario portions each having a distinct scenario; and a plurality of overlay portions corresponding to the plurality of scenario portions, the plurality of overlay portions being customizable by the user to customize interaction with the suite of web services, each of the plurality of overlay portions being an expanded translucent display provided over a respective scenario portion of the plurality of scenario portions, wherein the each of the plurality of overlay portions animates from the respective scenario portion from an initial size to an expanded size.

2. A method as recited in claim 1, wherein at least one of the plurality of overlay portions includes previous actions performed by the user via the suite of web services.

3. A method as recited in claim 1, wherein:
at least one of the overlay portions include representations of the suite of web services and a search portion that is configured to accept text to search the suite of web services, and where at least one of the representations of the suite of web services is selectable to navigate to a respective web service.

4. A method as recited in claim 1, wherein at least one of the plurality of overlay portions describes one or more external representations of a user that is interacting with the suite of web services the external representations associated with a persona of the user.

5. A method comprising: forming a communication that includes credentials to log a user onto a suite of web services; and outputting a user interface having a plurality of portions, wherein each of the plurality of portions animates from an initial size to an expanded size and at least one of the expanded size portions includes representations of a plurality of the web services and is configured to accept text to search two or more of the web services, wherein one of the plurality of portions is a user representative portion that includes a representation of the user when the user representative portion is at the initial size, and wherein the representation and additional data is used to provide an external representation of the user to other users over a network user when the user representative portion is at the expanded size.

6. A method as recited in claim 5, wherein one or more of the plurality of portions are customizable by the user by using overlays, the overlays activated by a mouse click input or a curser hover associated with the one or more of the plurality of portions.

7. A method as recited in claim 5, wherein at least one of the representations of the plurality of web services is selectable to output an overlay of actions that are performable using the corresponding the web service.

8. A method as recited in claim 5, wherein the user interface is configured to output an overlay display having representations of additional content that are selectable by the user to cause the additional content to be included in the user interface while maintaining a display of at least part of the plurality of portions.

9. A method as recited in claim 5, wherein the expanded size portions are displayable as a translucent overlay display over respective initial size portions.

10. A method of providing user access to a plurality of web services made available over a network of servers, the method comprising:

causing a display of a plurality of scenario portions at a first size, the plurality of scenario portions including at least one of a title or an image; causing a display of at least one expanded portion related to an associated scenario portion of the plurality of scenario portions, the expanded portion being translucent and displayed at a second size concurrently with associated scenario portion, the expanded portion including information representative of the associated scenario portion, wherein at least one expanded portion animates from the first size to the second size, the second size being larger than the first size; and providing access to web services and a web search engine via the at least one expanded portion while continuing to display the plurality of scenario portions.

11. A method as recited in claim 10, wherein the providing access to web services includes providing selectable web services that, when selected, display information related to the web service via an overlay display while maintaining at least part of the display of the at least one expanded portion.

12. A method as recited in claim 10, further comprising providing a second expanded portion associated with a second associated scenario portion of the plurality of scenario portions, the second associated scenario portion including a representation of a user that is logged into the web services, and the second expanded portion including one or more external representations of the user.

13. A method as recited in claim 10, further comprising providing a third expanded portion associated with a third associated scenario portion of the plurality of scenario portions, the third expanded portion including descriptions of communication attempts made to a user that is interacting with the web services.

14. A method as recited in claim 13, wherein the descriptions describe a communication attempt that was made while the user logged out of the web services.

15. A method as recited in claim 10, further comprising providing a fourth expanded portion associated with a fourth associated scenario portion of the plurality of scenario portions, the fourth expanded portion including a description of news events obtained from the web services.

* * * * *

UNITED STATES PATENT AND TRADEMARK OFFICE
CERTIFICATE OF CORRECTION

PATENT NO.       : 7,464,342 B2                                       Page 1 of 1
APPLICATION NO.  : 11/276446
DATED            : December 9, 2008
INVENTOR(S)      : Tammy L. Savage et al.

It is certified that error appears in the above-identified patent and that said Letters Patent is hereby corrected as shown below:

In column 8, line 37, in Claim 4, delete "services" and insert -- services, --, therefor.

Signed and Sealed this
Tenth Day of May, 2011

David J. Kappos
*Director of the United States Patent and Trademark Office*